US009866912B2

(12) United States Patent
Baskaran et al.

(10) Patent No.: US 9,866,912 B2
(45) Date of Patent: Jan. 9, 2018

(54) METHOD, APPARATUS, AND SYSTEM FOR IMPLEMENTING A NATURAL USER INTERFACE

(71) Applicant: Verizon Patent and Licensing Inc., Arlington, VA (US)

(72) Inventors: Arjun Baskaran, Chennai (IN); Sankar Ram Dhanabalan, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 30 days.

(21) Appl. No.: 14/326,139

(22) Filed: Jul. 8, 2014

(65) Prior Publication Data
US 2016/0014465 A1 Jan. 14, 2016

(51) Int. Cl.
| | | |
|---|---|---|
| G06F 3/00 | (2006.01) | |
| G06F 13/00 | (2006.01) | |
| H04N 5/445 | (2011.01) | |
| H04N 21/482 | (2011.01) | |
| G06F 3/01 | (2006.01) | |
| G06F 3/16 | (2006.01) | |
| H04N 5/44 | (2011.01) | |
| H04N 21/422 | (2011.01) | |
| H04N 21/4223 | (2011.01) | |
| H04N 21/442 | (2011.01) | |
| G06F 3/0487 | (2013.01) | |

(52) U.S. Cl.
CPC .......... *H04N 21/482* (2013.01); *G06F 3/017* (2013.01); *G06F 3/0487* (2013.01); *G06F 3/167* (2013.01); *H04N 5/4403* (2013.01); *H04N 21/4223* (2013.01); *H04N 21/42203* (2013.01); *H04N 21/42204* (2013.01); *H04N 21/44218* (2013.01)

(58) Field of Classification Search
CPC .......... H04N 2005/44547; H04N 2005/44556; H04N 2005/44565; H04N 5/44543
USPC .................... 725/38, 52, 100, 139
See application file for complete search history.

(56) References Cited

U.S. PATENT DOCUMENTS

| | | | | |
|---|---|---|---|---|
| 9,100,694 B1* | 8/2015 | Chandel | ............ | H04N 21/44218 |
| 9,232,274 B2* | 1/2016 | Meuninck | .......... | H04N 21/4334 |
| 2011/0099157 A1* | 4/2011 | LeBeau | ............ | H04M 1/72533 |
| | | | | 707/706 |
| 2014/0130116 A1* | 5/2014 | Krikorian | ............... | G06F 3/017 |
| | | | | 725/139 |

\* cited by examiner

*Primary Examiner* — Nnenna Ekpo

(57) ABSTRACT

A method, apparatus, and system are disclosed for controlling a set-top box based on natural input from a user through various types of devices. Input devices are used to collect sensor data that represents natural user input for controlling the set-top box. The sensor data is parsed in order to identify the natural user input, and a user interface event is generated based on the natural user input. The user interface event is one that is supported by the set-top box. The user interface event is subsequently communicated to the set-top box.

21 Claims, 14 Drawing Sheets

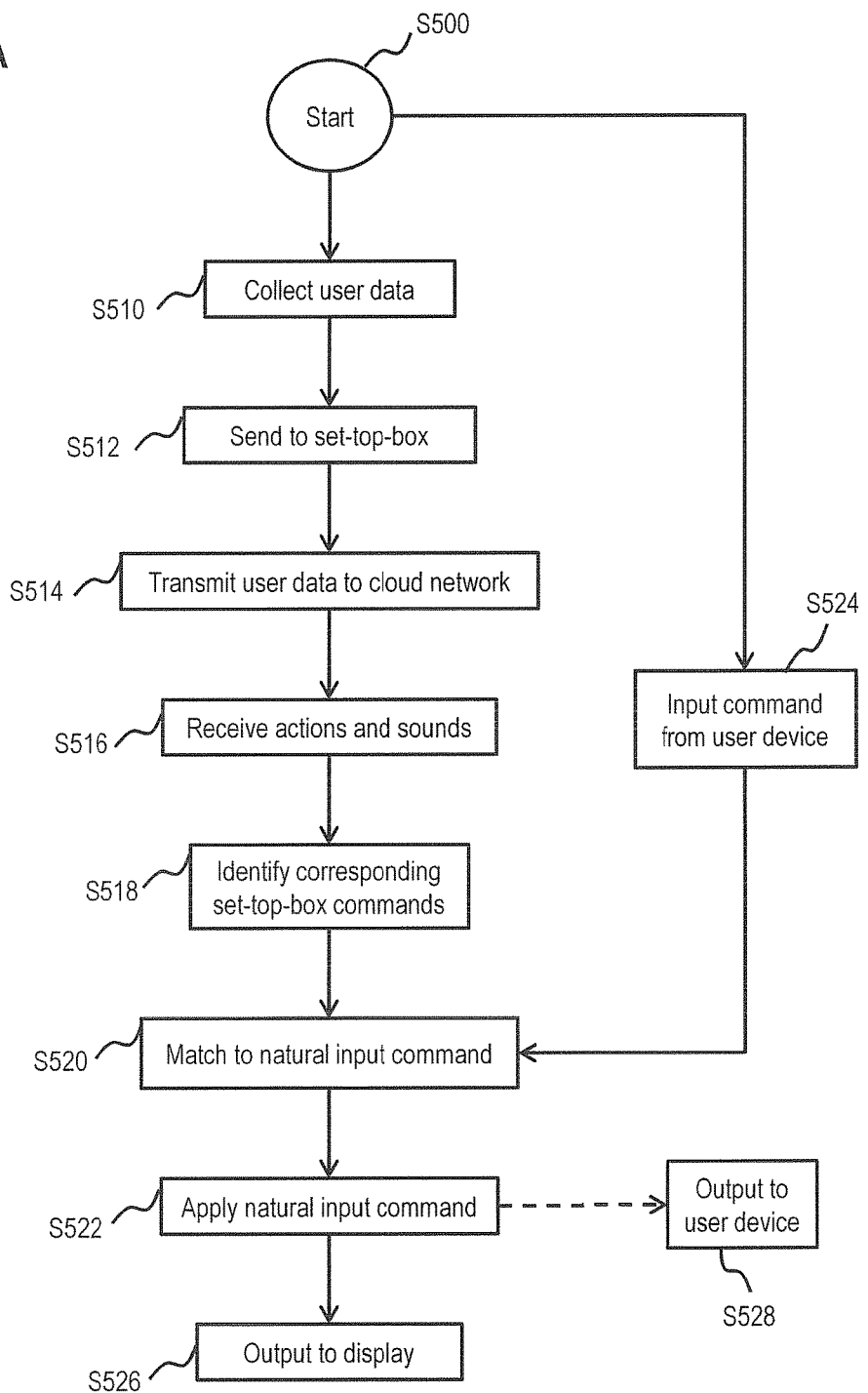

US 9,866,912 B2

METHOD, APPARATUS, AND SYSTEM FOR IMPLEMENTING A NATURAL USER INTERFACE

BACKGROUND INFORMATION

An emerging trend in today's society is the use of physical gestures and voice to control devices such as mobile phones, tablets, portable gaming units, personal digital assistants (PDA), tablet computers, etc. These devices allow the user to enter commands using various motions, touch, and voice commands. As the use of such devices continues to increase, users have become progressively dissatisfied with devices that incorporate conventional controls units, such as a remote control that are infrared based and must be pointed at the device associated therewith. Although recent trends have led to the increased availability of radio frequency remote controls that do not require a direct line of sight to the device, the convenience provided by, for example, touch based device interfaces remain unmatched.

One such example involves the use of set-top boxes which provide entertainment to a household. Such set-top boxes often utilize a remote control unit to control content and navigate through various menus. For example, the menus may allow a user to select music, video programs, customized settings, etc. Additionally, set-top boxes allow users to integrate different component devices together in order to further enrich their entertainment experience. The use of multiple component devices, however, has a disadvantage of increasing the number of remote control units required for a user to control all of the component devices. Furthermore, if a remote control is misplaced, all features of the associated component device may not be readily accessible. As the use of newer interfaces increases, users often look to upgrade to newer products that incorporate such changes. Based on the foregoing, there is a need for an approach to provide an interface which allows control of a set-top box without the need for a physical remote control unit.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 5A is a flowchart illustrating control of a set-top box using natural input, according to one embodiment;

DESCRIPTION OF THE PREFERRED EMBODIMENT

A method, apparatus, and system for controlling a set-top box based on natural input from a user and input from a user device are described. In the following description, for the purposes of explanation, numerous specific details are set forth in order to provide a thorough understanding of the disclosed embodiments. It is apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
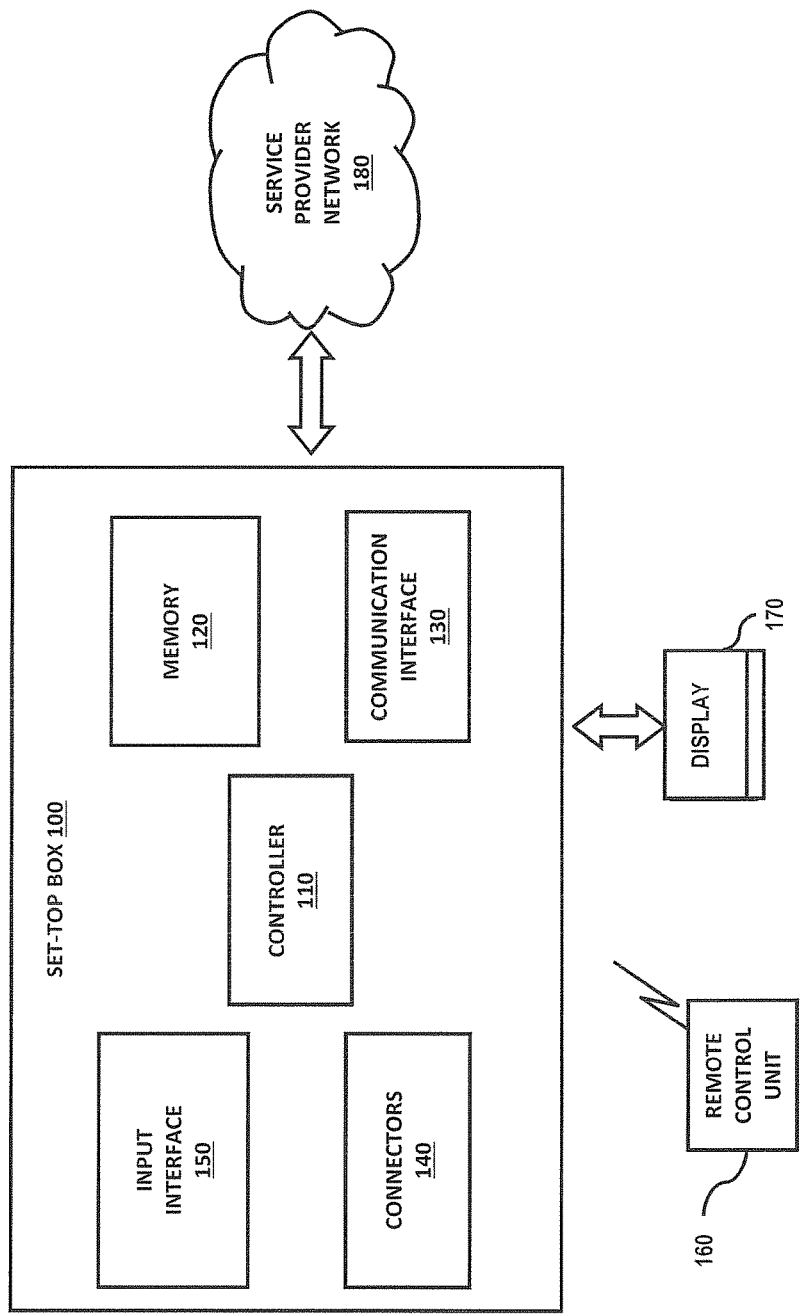
FIG. 1 is a hardware diagram of a set-top box, according to an exemplary embodiment.

FIG. 1 is a hardware diagram of a set-top box, according to an exemplary embodiment. The set-top box 100 may utilize any suitable technology to transmit and receive information to and from various components, as well as to and from a service provider network 180. For example, the set-top box 100 can communicate with the service provider network 180 using a packet-based network and/or a telephony network. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (Wi-Fi) networks, other wireless networks (e.g., 3G wireless broadband networks, mobile television networks, radio networks, etc.), terrestrial broadcasting networks, provider specific networks (e.g., a Verizon® FiOS® network, a TiVo network, etc.), and the like. Such networks may also utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like, to connect set-top box 100

The set-top box 100 may further comprise computing hardware (such as described with respect to FIGS. 8 and 9) and include additional components configured to provide various services. In addition, the set-top box 100 may include hardware and/or other components to support related functions and capabilities for viewing video assets (e.g., remote control capabilities, conditional access functions, tuning functions, presentation functions, multiple network interfaces, audio/video signal ports, etc.). As shown in FIG. 1, the functions and operations of the set-top box 100 may be governed by a controller (and/or processor) 110. Additionally, the controller 110 interacts with each of the set-top box components. A remote control unit 160 can also be provided to control operation of the set-top box 100. A memory 120 is provided for storing information including, for example, set-top box configuration preferences, user preferences, etc.

The set-top box 100 may be configured to communicate with a number of user devices, including: a PC, laptops, PDAs, cellular phones, mobile devices, handheld devices, as well as any other equivalent technology. Furthermore, the set-top box 100 may include a communication interface 130 configured to transmit and receive information to and from a service provider. The communication interface 130 may optionally include single or multiple port interfaces. For example, the set-top box 110 may establish a broadband connection to multiple sources within the service provider network 180 via a single port, whereas in alternative embodiments, multiple ports may be assigned to the one or more sources. In still other embodiments, the communication interface 130 may be configured to permit connections with local user devices using various technologies such as wireless, RF, Bluetooth, proprietary, etc. According to various embodiments, the set-top box 100 may also include inputs/outputs to a display 170 such as a television or monitor.

The set-top box 100 may include various connectors 140 which provide physical interfaces to, for example, the display 170, as well as other peripherals. The physical interfaces may include, for example, RJ45, RJ11, high definition multimedia interface (HDMI), optical, coax, FireWire®, wireless, and universal serial bus (USB), or any other suitable connector. The remote control unit 160 may include (not shown) a cursor controller, trackball, touch screen, touch pad, keyboard, and/or a key pad for activating a slideshow application, selecting programming content, as well as performing other control functions. The remote control unit 160 may also include functional actuators (e.g., buttons, keys, icons, etc.), such as power on/off, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like. Further, the remote control unit 160 may comprise a memory (not illustrated) for storing preferences relating the device event-based set-top box control service; such preferences can be conveyed to set-top box 100 through an input interface 150. The input interface 150 may support any type of wired and/or wireless link, e.g., infrared, radio frequency (RF), BLUETOOTH™, and the like.

Figure 2:
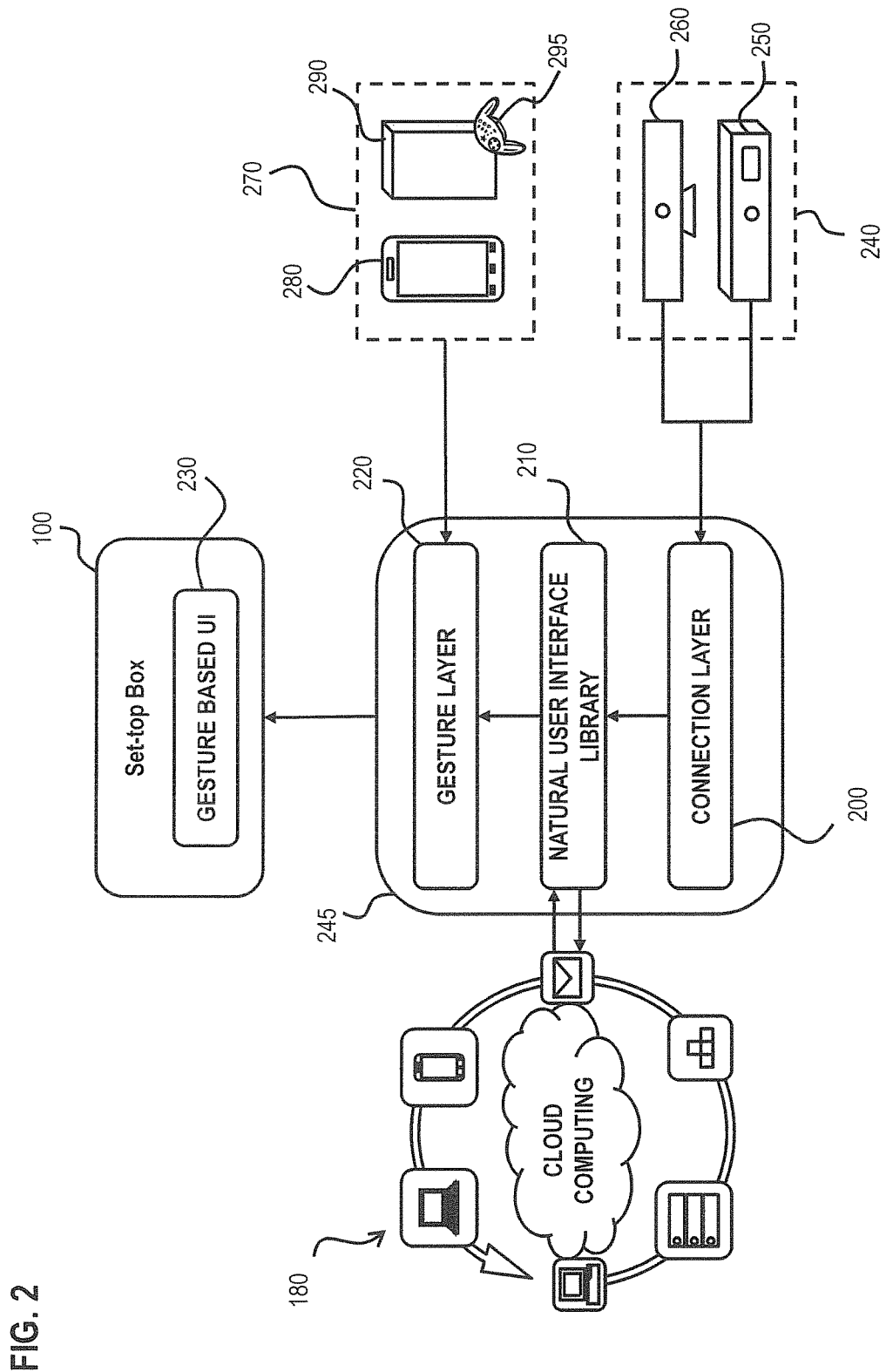
FIG. 2 is an architecture and hardware diagram of a natural user interface for a set-top box, according to one embodiment.

FIG. 2 illustrates an exemplary architecture for a natural user interface in accordance with at least one embodiment. The natural user interface is embedded within the set-top box 100 for translating/interpreting input from a user and applying a command corresponding to such input. According to at least one embodiment, the natural user interface architecture can be configured as one or more middleware components which reside above a connection layer 200. For example, a natural user interface (NUI) library 210 can be provided as a first middleware component above the connection layer 200. A gesture layer 220 can be provided as another middleware component above the NUI library 210. A gesture-based user interface (UI) 230 can further be provided as the third middleware component above the gesture layer 220. According to one or more embodiments, the NUI library 210, the gesture layer 220, and the gesture-based UI 230 can be configured as a single middleware component. According to other embodiments, the NUI library 210 and the gesture layer 220 can be configured as a single middleware component, while the gesture-based UI 230 is configured as an independent middleware component. Thus, according to different embodiments, one or more of the exemplary middleware components can be combined as a single middleware component.

As illustrated in FIG. 2, various external input devices 240 can be interfaced with the set-top box 100 in order to collect and provide different types of input and/or data. For example, a sensor unit 250 can be interfaced with the set-top box 100 through, for example, the connection layer 200 in order to provide various types of user data collected by the sensor unit 250. For example, the sensor unit 250 may be equipped with one or more cameras to record and analyze motion. Furthermore, the sensor unit 250 can include a microphone unit capable of recording sound. The recorded video and sound can be converted to digital data using, for example, and analog to digital converter. The data corresponding to the movement and/or sound is then transferred to the connection layer 200.

According to at least one embodiment, a console sensor 260 can be interfaced with the set-top box 100 through the connection layer 200. Such console sensors 260 are typically marketed as accessories for video game consoles that are purchased by many users. According to various embodiments, the console sensor 260 can also include one or more camera units for recording motion, and one or more microphones for recording sound. The recorded video and sound is then transferred to the connection layer 200 in the form of digital data. According to other embodiments, the console sensor 260 may only include a camera for recording video. According to still further embodiments, a console sensor 260 which only includes a camera can be used in conjunction with a separate microphone unit that may be interfaced directly to the console sensor 260. According to other embodiments, the microphone can be provided as a separate unit which interfaces directly to the set-top box 100.

The digital data received from the sensor unit 250 is then passed to the NUI library 210 by the connection layer 200. According to an embodiment, the sensor unit 250 continually collects data and transfers it to the connection layer 200 in a streaming manner. For example, the sensor unit 250 can continually record audio and/or video data, and stream the data to the connection layer 200 in real time. According to other embodiments, the sensor unit 250 can include hardware and software for parsing the data stream to detect specific gestures and sounds that correspond to specific input and/or commands associated with the sensor unit. Accordingly, only the portion of the data stream corresponding to the identified gesture and/or sound would be transmitted to the connection layer 200.

Further embodiments can provide for one or more of the middleware components to be separately configured as a natural input translation platform 245. As illustrated in FIG. 2, for example, the connection layer 200, NUI library 210, and gesture layer 220 can be configured as a translation platform 245. According to various embodiments, the translation platform 245 can be incorporated within the set-top box 100 or configured as an external component which communicates directly with the gesture-based UI and the set-top box 100. Upon receiving data from the input device 240, the natural input translation platform 245 can initiate parsing of the natural input supplied by the user from the sensor data. The natural input translation platform 245 can further generate a user interface event supported by the set-top box 100 based on the natural user input. The user interface event is subsequently mapped to a user interface region of the set-top box 100. According to an embodiment, the user interface region can be identified based on a previous registration thereof. According to another embodiment, an input can be provided in order to register the user interface region. The user interface event is then communicated to the set-top box 100 in order to perform an operation selected by the user.

According to at least one embodiment, the NUI library 210 interfaces directly to a cloud network, such is the service provider network 180. The data is then analyzed in order to identify various information intended to be conveyed by the user. The analysis performed by the service provider network 180 will also vary depending on the specific embodiment. For example, if the data received from the sensor unit 250 is in the form of a continuous data stream, then the analysis would first require parsing the data stream to identify meaningful movements or sound. If the data received from the sensor unit 250 is in the form discrete segments that have already been parsed by the sensor unit 250, then the analysis would only require identification or mapping of the gesture and/or sound recognized by the sensor unit 250 into motion and speech recognized by the set-top box 100. For example, the data can include specific motions performed by the user, specific commands spoken by the user, or a combination of both. Furthermore, the data can be analyzed in order to detect the presence or absence of the user in the vicinity of the set-top box 100. Furthermore, specific motion toward or away from the set-top box 100 or independent movement of the user's fingers can be determined through analysis of the collected data. Upon identifying the specific actions, sound, etc. contained in the data, the service provider network 180 returns such information to the NUI library 210.

The NUI library 210 provides an interface for allowing various motions and sounds from different external input devices 240 to interact with the set-top box 100. Such input devices 240 are non-native to the set-top box 100, and typically created and sold by various manufacturers independent of the set-top box 100. More particularly, the input devices 240 can be in the form of peripheral devices and/or accessories for hardware unrelated to the set-top box 100. As such, they are not configured with hardware and/or software interfaces, including APIs, drivers, etc., for interacting directly with the set-top box 100.

Thus, according to various embodiments, the NUI library 210 can provide a standard set of motions and sounds that allow input devices 240 from manufacturers to interface and interact with the set-top box. The NUI library 210 supplies the actions and sounds received from the service provider network 180 to the gesture layer 220 of the set-top box 100. The gesture layer 220 then analyzes the movements and sounds in order to determine if they correspond to specific gestures that can be recognized by the set-top box 100. For example, one movement may interpreted as the user moving their hand from left to right, which corresponds to specific commands that are recognized by the set-top box 100. As another example, the user may move one hand in an upward motion. The user may also open and close a hand, or move both hands diagonally toward or away from each other. All such motions may correspond to specific commands recognized by the set-top box 100. According to at least one embodiment, the movements performed by the user can represent commands presented using sign language. Thus, disabled users who are unable to supply vocal commands can provide equivalent input using sign language.

According to one or more embodiments, the gesture layer 220 further detects the current state of the set-top box 100 in order to determine the appropriate interpretation of the user's actions. For example, if the set-top box 100 is in a state where the user is watching a recorded program or a live show, moving a hand from left to right may correspond to a fast forward request. Conversely, moving a hand from right to left may correspond to a request for rewinding the program. Moving a hand toward the sensor unit 250, or closing a hand, may correspond to a request for pausing the program. If the user is currently using a different function of the set-top box 100, such as a program guide, then the same actions from the user may correspond to different commands for the set-top box 100.

Once the gesture layer 220 has properly interpreted the user's actions, the appropriate command is supplied to the gesture-based UI 230. The gesture-based UI 230 then applies the appropriate command to the set-top box 100. The resulting functions are then activated and/or confirmed. For example, if the user's action was analyzed to be a voice utterance of the word "guide" while watching a particular program, the gesture-based UI 230 would cause the set-top box 100 to display the program guide on the user's display device (e.g., a television, computer monitor, etc.).

According to at least one embodiment, various user devices 270 can be used to provide direct input to the gesture layer 220. As illustrated in FIG. 2, a mobile device 280 such as a tablet, mobile phone, e-reader, etc., can be used to provide input directly to the gesture layer 220. Such devices can be configured such that the user is capable of interacting through a touch screen interface and/or through one or more buttons or other mechanical input components. According to other embodiments, such mobile devices 280 may incorporate the use of a pen-like input unit such as a stylus in conjunction with, or instead of, a touchscreen interface. As will be discussed in greater detail below, input from such mobile devices 280 may be provided in various ways. According to further embodiments, a control unit 295 from a game console 290 can also be used to provide various types of input directly to the gesture layer 220.

Figure 3A:
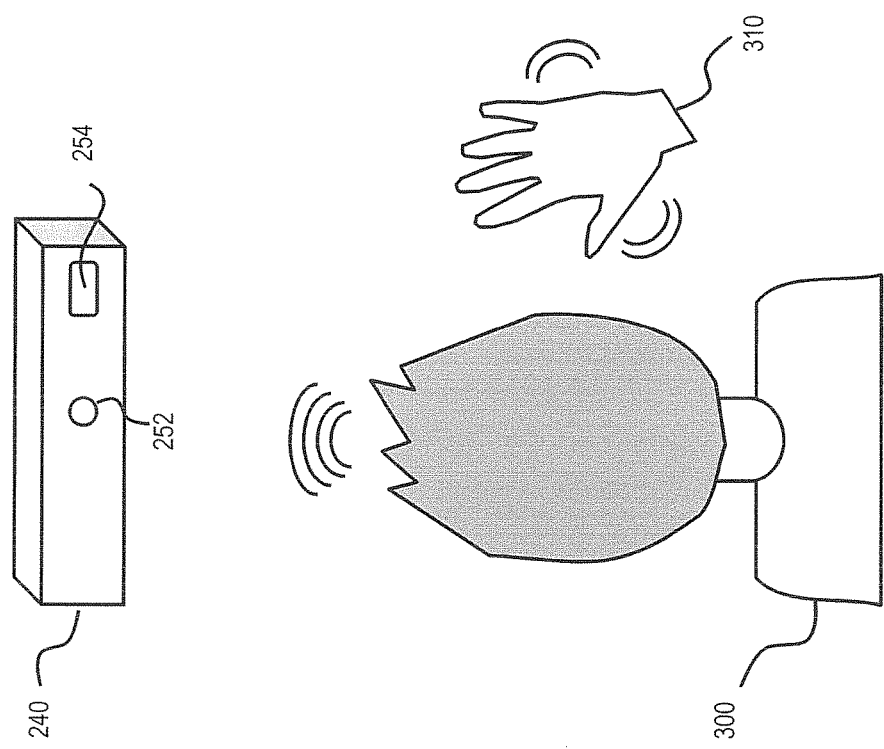
FIG. 3A illustrates an exemplary sensor unit for receiving command inputs, according to one embodiment.

FIG. 3A illustrates an exemplary sensor unit 250 for receiving control input from a user 300 in accordance with at least one embodiment. As illustrated in the figure, the sensor unit 250 includes a camera 252 and a microphone 254. As previously discussed, the sensor unit 250 may optionally include a second, or additional, cameras (not shown). Furthermore, it may be possible to utilize a sensor unit 250 which further incorporates a dedicated motion detector (not shown). Thus, according to at least one embodiment, the sensor unit 250 would be capable of detecting when a user 300 enters an area within the vicinity of the set-top box 100 by using information from the motion detector or analyzing collected video information. Furthermore, an external camera unit (not shown) can be provided for connection directly to the sensor unit 250 or the set-top box 100. Similarly, an external microphone (not shown) can be separately provided for direct connection to the sensor unit 250 or the set-top box 100. Thus, if a selected sensor unit 250 does not have a microphone, then the external microphone can be used to receive input sounds from the user 300. A sensor unit 250 which only incorporates one camera 252, for example, can be configured for connection with a second, or external, camera unit in order to provide an additional level of user data collection.

Figure 3B:
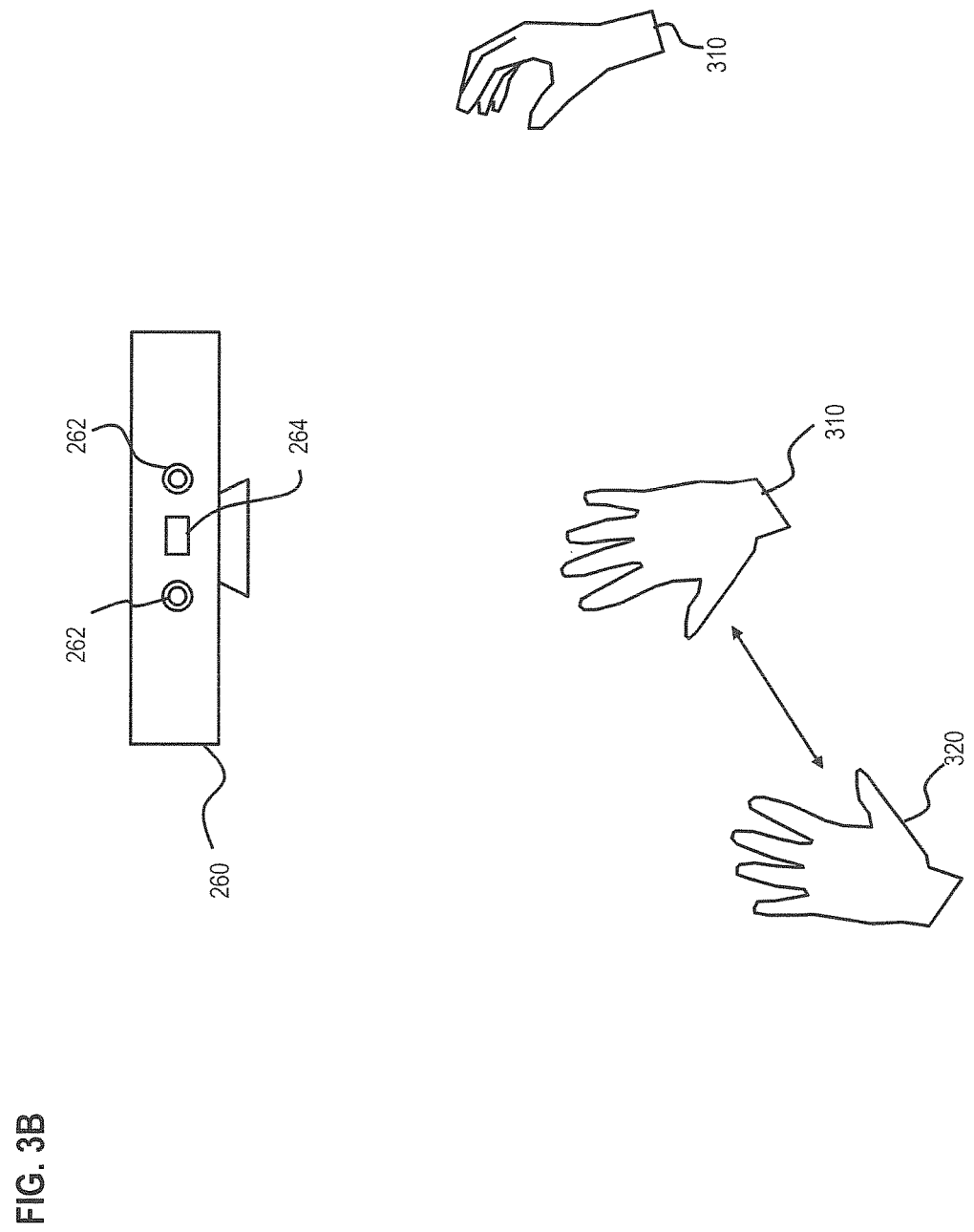
FIG. 3B illustrates an exemplary console sensor for receiving command inputs, according to one embodiment.

FIG. 3B illustrates an exemplary console sensor 260 for receiving control input from a user 300, in accordance with at least one embodiment. The illustrated console sensor 260 includes two cameras 262 and a microphone 264 for receiving control input from the user 300. Although the console sensor 260 is equipped with two cameras 262, various embodiments support the use of external cameras depending on the level of granularity desired for interpreting specific control inputs from the user 300. The external cameras can then be connected directly to the console sensor 260 or the set-top box 100. Furthermore, an external microphone (not shown) can be connected directly to the console sensor 260 or the set-top box 100.

As illustrated in FIGS. 3A and 3B, control input can be provided by a user 300 in various ways, including single hand motion 310, two-hand motion 310, 320, finger motion 330, sound, or any combination thereof. Furthermore, various embodiments allow passive motions or activities to be interpreted as control input. For example, if a user 300 is currently watching a program, and moves a predetermined distance away from the set-top box 100, the program may automatically pause until the user 300 returns. Furthermore, if the user 300 turns away from the display screen, any program being watched may be automatically paused.

Referring to in FIG. 3B, control input can be provided by a user 300 using two hands (310, 320) to perform various types of motions. For example, if a user 300 moves two hands (310, 320) diagonally away from each other, such a control input can be interpreted as a command to zoom the current display. Thus, if a user 300 currently viewing a media file such as a digital photograph desires to enlarge the display or reduce it, the preceding control input would result in enlargement or reduction of the digital photograph on the user's television. If a user 300 is customizing a picture-in-picture configuration for the set-top box 100, then such control input would be interpreted as a request to increase the size of one of the viewing windows. Conversely, if the user 300 moves both hands diagonally toward each other, the set-top box 100 would interpret such control input as a desire to reduce the current display.

The user 300 may also provide control input using both motion and sound. For example, according to one embodiment, the menu for the set-top box 100 may be accessed by the user 300 speaking the word "menu". In response to such a command, a top level of the menu tree for the set-top box 100 would be displayed (e.g., on the television screen). The user 300 can select different items on the menu, for example, by closing one hand 330 in an area corresponding to a desired selection. According to various other embodiments, the user 300 can perform a pointing motion toward the input device 240 with a single finger in order to indicate selection of a particular item. As can be appreciated, various embodiments may utilize the cameras (252, 262) to track the user's hand motions and map it directly onto the screen. Thus, as the user 300 moves one hand 310 (or both) to different areas, the display screen would highlight different items within the menu in accordance with the hand movements. Upon arriving at a desired item, the user 300 can perform the specific selection motion in order to activate or select that particular menu item. As illustrated in FIG. 3B, the user 300 can also perform various movements using fingers of one hand 330, or both, in order to provide control input to the set-top box 100.

Figure 4:
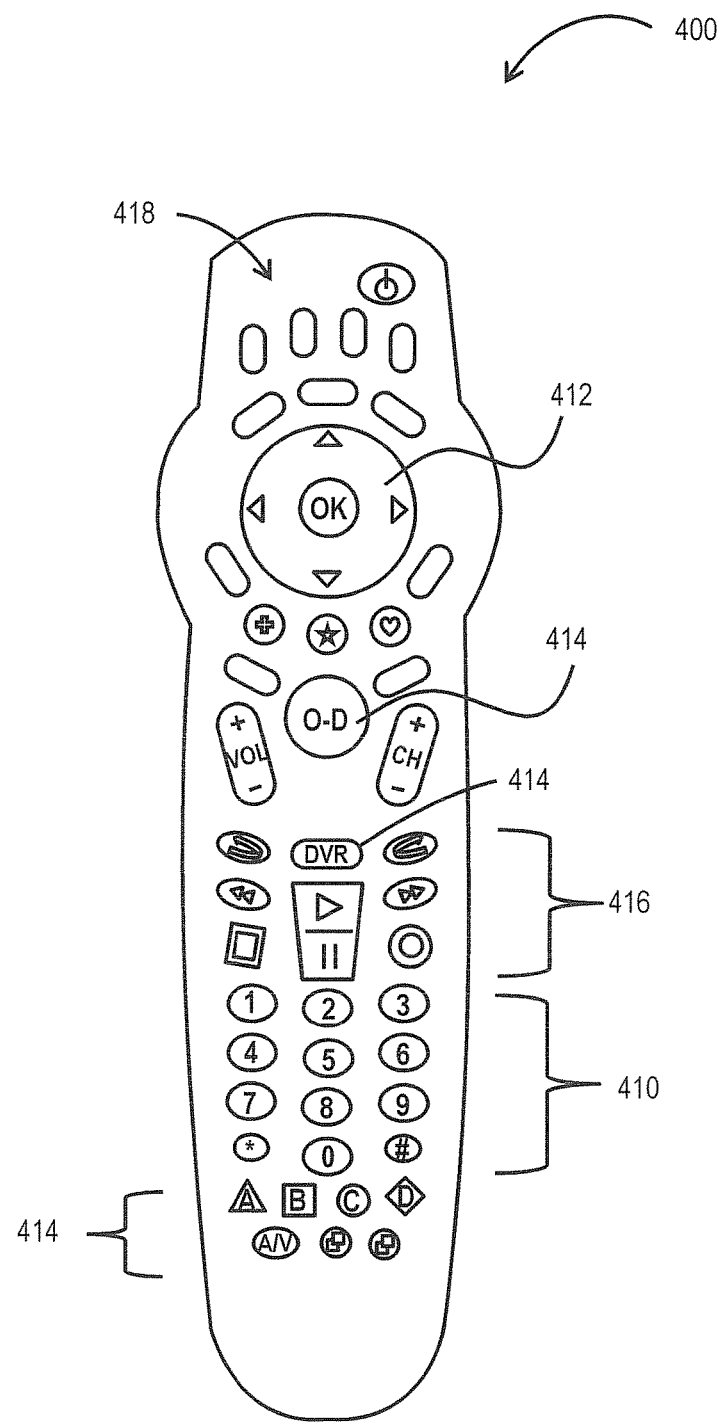
FIG. 4 illustrates a remote control unit for a set-top box, according to one embodiment.

FIG. 4 illustrates a remote control unit 400 in accordance with at least one embodiment. Such remote control units 400, are configured to provide access and control to various features of the set-top box 100. For example, the remote control unit 400 includes a numeric keypad 410 which allows the user to directly input certain information such as a desired channel, selection of a particular item within the displayed menu screen, etc. A navigation pad 412 is also provided which allows the user to move through different selections within the displayed menu or to access different features that may be currently displayed on the television. The remote control unit 400 can also include various function buttons 414 which quickly allow the user to access common functions such as the program guide, and a control pad 416 for a digital video recorder or media player. The remote control 400 unit can also allow the user to interact with various other external items, such as the television, audio video receiver, DVD player, etc., using device configuration keys. According to one or more embodiments, all of the functions available to control the set-top box 100 may be accessed using motion or sound control input from the user.

FIG. 5A is a flowchart illustrating control of a set-top box using natural input, according to one embodiment. The process begins at S500 and proceeds, for example, to S510. At S510, user data is collected using an input device 240, such as the input sensor 250 or console sensor 260. As previously discussed, such user data can correspond to motion, sound, or a combination thereof. At S512, the collected user data is sent to the set-top-box 100. According to at least one embodiment, the input device 240 can be configured to initiate user data collection based upon a predetermined event trigger. The input device 240 can also be configured to parse the data stream in order to detect specific input gestures and/or sounds. According to other embodiments, user data collection can proceed continuously. Furthermore, the user data can be continuously sent to the set-top-box 100 or at discrete time intervals.

At S514, the collected user data is transmitted to a cloud network 180 of the service provider. The user data is analyzed in the cloud in order to determine the actions and sounds corresponding to the user data. Thus, according to at least one embodiment, input devices 240 capable of collecting data using different formats can be used abstractly with the set-top box 100. The precise format can be analyzed at the cloud network 180 using appropriate resources that may not be available within the set-top-box 100 due to various physical and processing limitations. Additionally, the analysis performed at the cloud network 180 can vary based on the manner in which the data is received from the input device 240. For example, if the input device 240 transmits a continuous stream of audio and/or video data, then the cloud network 180 would first parse the data in order to identify any input gestures or sounds. If the input device 240 transmits discrete segments of data that have already been parsed to correspond to a recognized input gesture or sound, then no further data parsing is required by the cloud network 180. Regardless of the manner in which the data is received, the cloud network 180 performs additional analysis to identify and/or convert the input gesture or sound into a standard format. At S516, the actions and sounds corresponding to the user data are received by the set-top box 100. According to one or more embodiments, the user data is received from the input device at the connection layer 200. Furthermore, the connectivity between the cloud network 180 and the set-top box 100 occurs through the NUI library 210.

At S518, the actions and sounds are analyzed in order to determine if they match any of the commands for the set-top-box 100. According to at least one embodiment, the analysis is performed at the gesture layer 220. At S520 the set-top-box command is matched to a corresponding natural input command. As previously discussed, a user device 270 can be used to provide input to the set-top-box 100. Thus, rather than collecting user data for cloud analysis, the user device 270 provides input commands directly to the gesture layer at S524 for matching to natural input commands. At S522, the natural input commands are applied to the set-top-box 100. The results of the natural input command are then output to a display, such as the user's television, at S526. Depending on the particular command, certain results may be displayed on the user device 270 at S528 instead of the display, or on both.

Figure 5B:
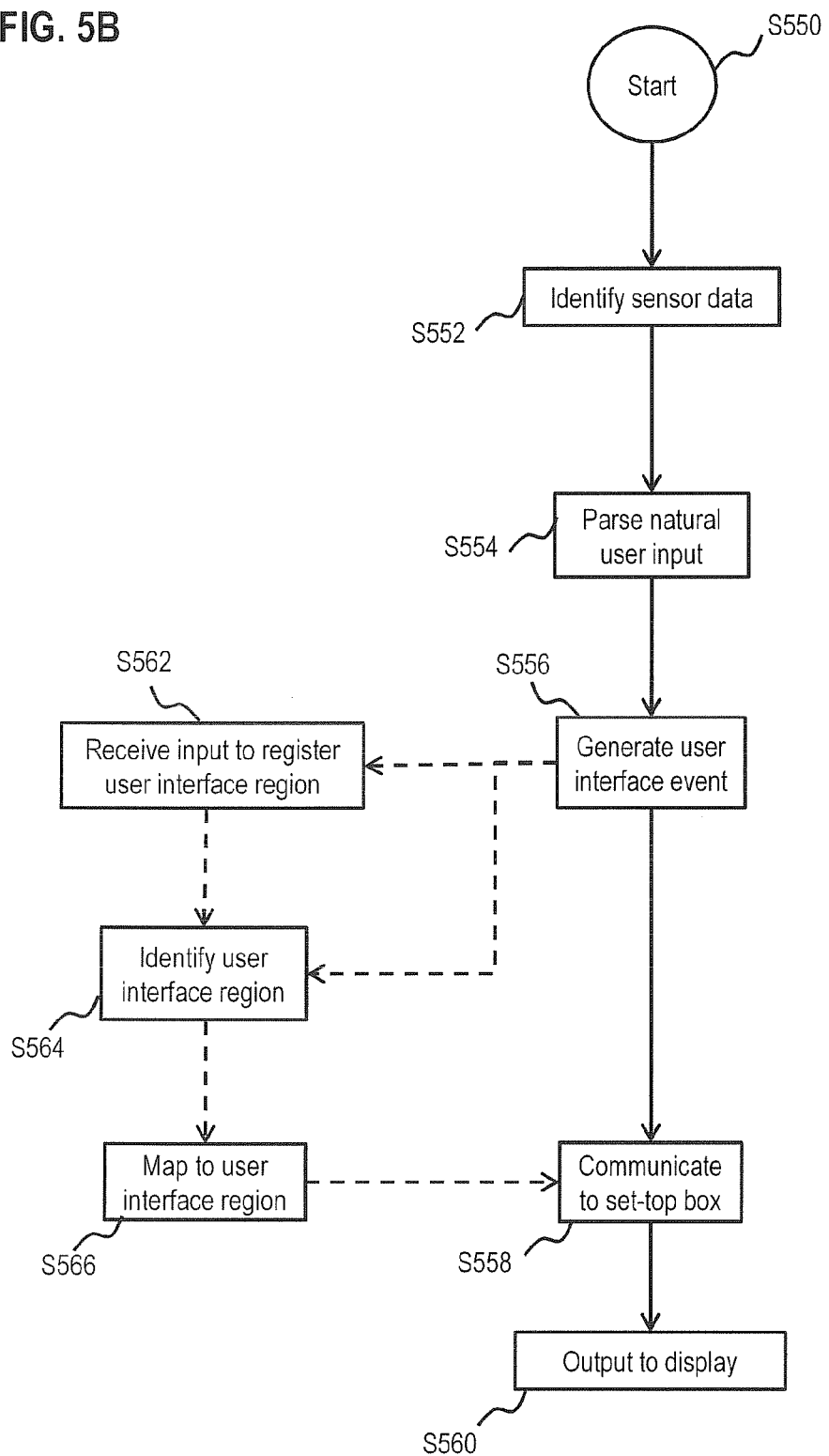
FIG. 5B is a flowchart illustrating control of a set-top box using natural input, according to another embodiment.

FIG. 5B is a flowchart illustrating control of a set-top box 100 using natural input, in accordance with another embodiment. The process begins at S550 and proceeds to S552 where sensor data is identified. The sensor data can be collected, for example, using an input device 240 or the like, as previously described. According to at least one embodiment, the identified sensor data can be in various formats corresponding to the specific input device 240 being used. More particularly, the sensor data can be in a form that is native to the input device 240, but non-native to the set-top box 100. The sensor data represents information that includes a natural user input that will be translated in order control and/or operate the set-top box 100. Additionally, different embodiments allow the sensor data to be presented in the form of audio data, video data, or both.

At S554, the sensor data is parsed in order to isolate natural user input for translation. According to at least one embodiment, the sensor data can be continuously collected by the input device 240. Parsing of the sensor data, therefore, allows discrete occurrences of natural user input to be detected from the continuous stream of sensor data. For example, if the input device 240 is in the form of a camera capable of capturing a video stream, then the sensor data being collected may be a continuous stream of video data which may or may not contain a natural user input. When a natural user input, such as a hand gesture, is performed, it is captured within the stream of sensor data. As the sensor data is parsed, the start and end positions of the natural user input are identified and isolated. According to at least one embodiment, upon identifying the natural user input from a segment of the sensor data, the remaining portion may be discarded in order to reduce storage requirements.

At S556 a user interface event supported by the set-top box 100 is generated. The user interface event is generated based on the natural user input. The user interface event can correspond, for example, to predefined gestures, voice commands, etc. According to one embodiment, the user interface event is generated from a common library of a plurality of user interfaces that are supported by the set-top box 100. The user interface event is then communicated to the set-top box at S558. According to at least one embodiment, an input can be received at S562 in order to identify and/or register a user interface region. According to other embodiments, the input can be used to register a configuration parameter associated with the user interface. The configuration parameter can include, for example, a gravity parameter that is used in select which user interface region from one or more user interface regions is mapped to the user interface event. The input can also be used to register both the interface region and a configuration parameter associated with user interface.

At S564, the user interface region is identified based on the registered user interface region, registered configuration parameter, or both. According to at least one embodiment, the user interface region can be identified without receiving an input for performing the aforementioned registrations. Thus, upon generating the user interface event at S556, control would pass to S564 where the user interface region is identified. At S566, the user interface event is mapped to the user interface region, and then communicated to set-top box 100 at S558. The set-top box 100 subsequently outputs the results of the user interface event to the display 170.

Figure 6A:
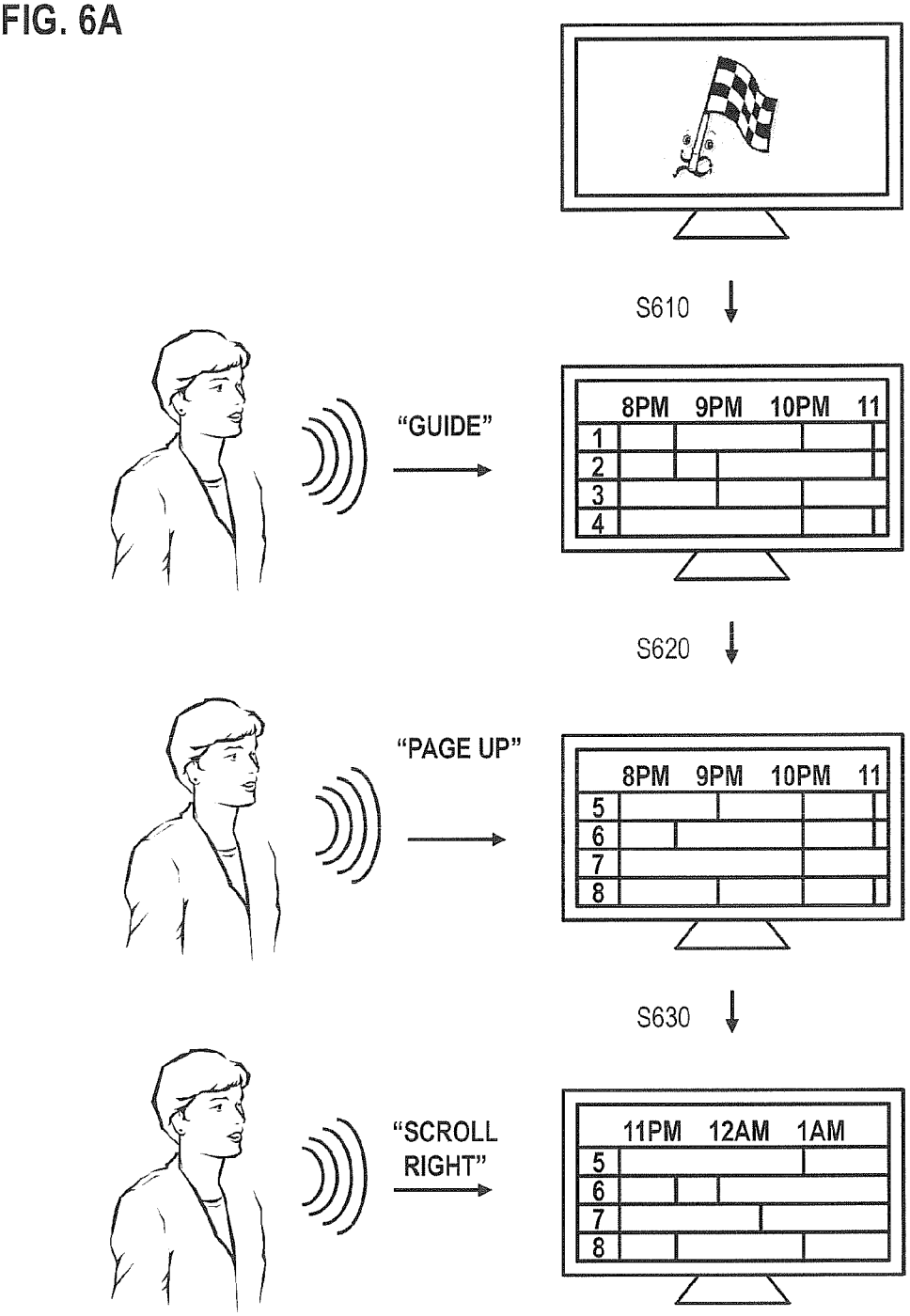
FIG. 6A is a flow diagram illustrating the use of command inputs to control a set-top box, according to one embodiment.

FIG. 6A is a process diagram illustrating the use of voice control inputs to navigate through the program guide, in accordance with at least one embodiment. At S600, the user is engaged in watching a live program on the television. At S610, the user speaks the command "guide". The sound is recorded by the microphone in the input device and transferred to the set-top box 100. The connection layer 200 supplies the data to the NUI library 210, which passes it along to the service provider network 180 for processing. The service provider network 180 interprets the data as the user's desire to examine the program guide, and sends this information back to the NUI library 210, which subsequently passes it to the gesture layer 220. The gesture layer 220 first identifies the state of the set-top box 100 in order to correctly interpret the action associated with the command.

As illustrated in FIG. 6A, for example, the user is watching a live broadcast. Thus, the appropriate action would be to display the program guide. However, it may be the case that the user is already viewing the program guide. Under such conditions, for example, the gesture layer 220 would interpret the command as corresponding to the user's desire to view a secondary guide, or a customized guide. More particularly, the set-top box 100 may be configured to allow different users to customize the program guide based on their viewing preferences. The customized program guides can be associated with corresponding users and stored for later access.

At S610, the program guide is displayed on the television. At S620 the user provides another control input by speaking "page up". This results in the next screen of the program guide being displayed for subsequent channels. For example, the program guide displays broadcast information for channels 1-4 after step S610. Upon receiving the "page up" command, broadcast information for channels 5-8 during the same time period. At S630, the user provides another control input by speaking the words "scroll right". In response, the set-top box 100 displays the program guide showing broadcast information for subsequent timeslots of the same channels. Thus, using various control input in the form of voice commands, the user can successfully navigate through the program guide and ultimately select a live program to view and/or record. Although discussed with respect to the program guide, it should be appreciated that all functions of the set-top box 100 can be accessed in a similar manner.

Figure 6B:
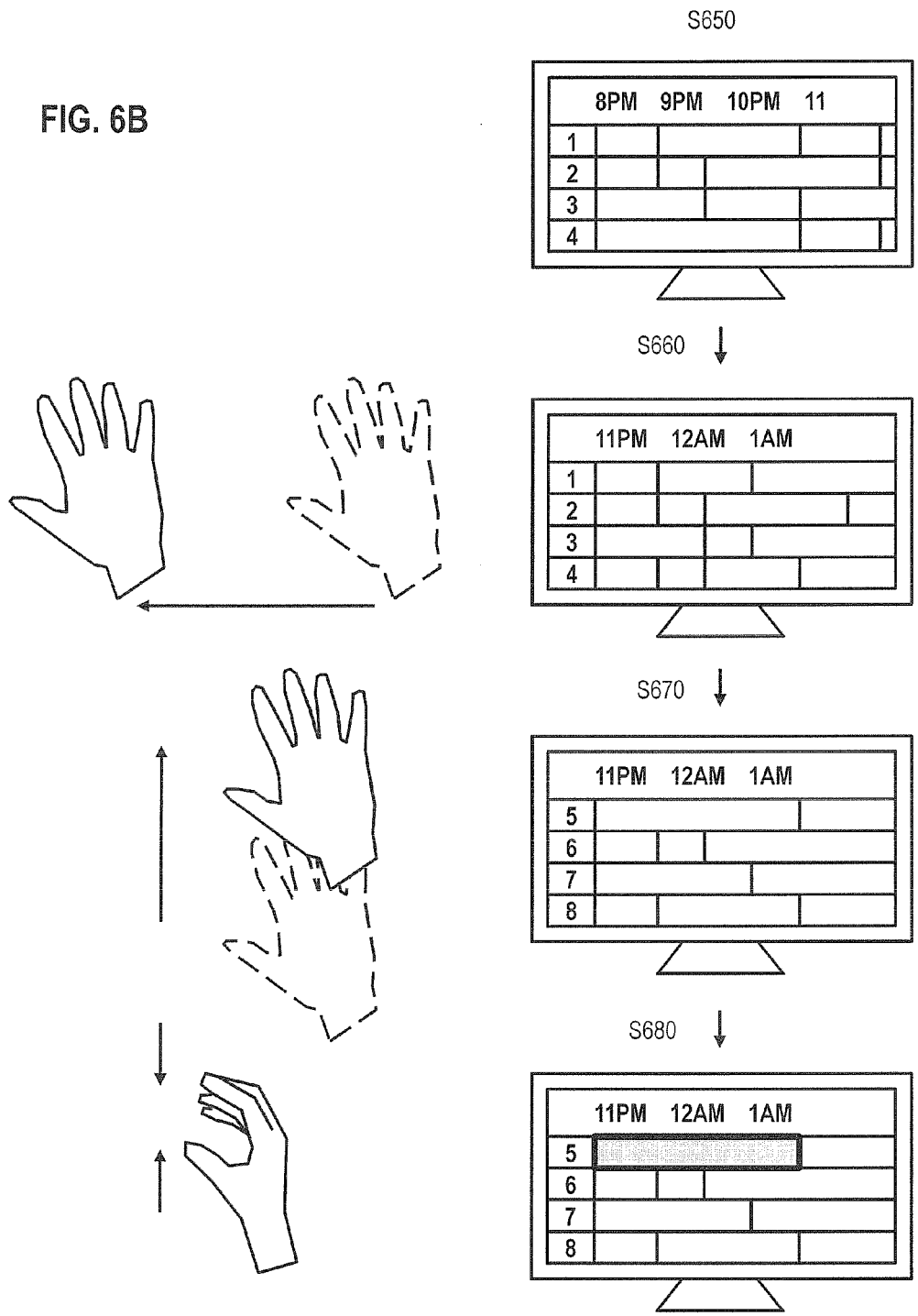
FIG. 6B is a flow diagram illustrating the use of command inputs to control a set-top box, according to another embodiment.

FIG. 6B is a process diagram illustrating control input in the form of hand motions for navigating through the program guide, in accordance with at least one embodiment. At S650, the user is currently browsing through the program guide displayed on the television screen. At S660, the user performs a right to left movement of a single hand. Such movement is captured by the cameras of the particular input device being used, and processed in a manner similar to the voice commands described with respect to FIG. 6A. The user's control input is interpreted as a desire to scroll the guide to the next, or subsequent, timeslots for the displayed channels. At S670, the user performs a motion from down to up with a single hand. Such a motion is interpreted as the user's desire to move to the next page of the channel guide. Thus, the set-top box 100 displays the next channels for the same timeslot on the television screen. As previously discussed, one or more embodiments allow the user's hand to be tracked and identified on the television screen. Thus, as the user moves one or both hands while the program guide is displayed, various programs are highlighted. Upon finding a desired program, the user performs a grabbing motion with one hand at S680. Such grabbing motion is interpreted as a selection of the highlighted item in the guide. Thus, the set-top box 100 causes the program selection to be highlighted on the television and/or automatically selects the program for viewing.

Figure 7A:
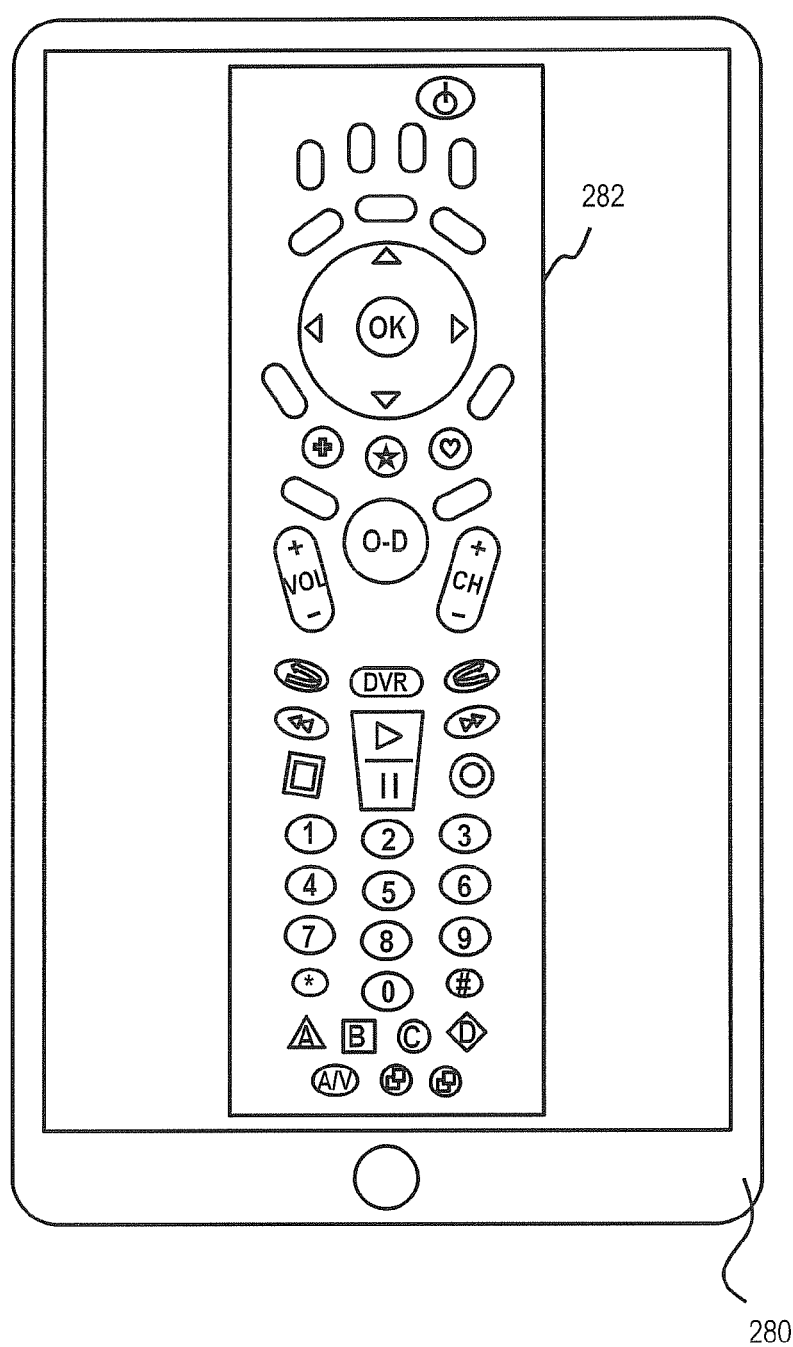
FIG. 7A illustrates a user device for controlling a set-top box, according to one embodiment.

FIG. 7A illustrates command input using a portable device 280, in accordance with at least one embodiment. As previously indicated, the portable device 280 can be in the form of various user devices, including tablets, mobile phones, e-readers, etc. Furthermore, the portable device 280 is capable of interfacing directly to the gesture layer 220 in order to provide commands to the gesture based UI 230. According to the illustrated embodiment, a tablet 280 is used as the exemplary portable device. The tablet 280 includes an application specifically designed to interface with, and control, the set-top box 100. Upon launching the application, a virtual remote control 282 is generated on the display screen of the tablet. According to at least one embodiment, the virtual remote control 282 includes all of the keys and functions available on the physical remote control unit provided with the set-top box 100. According to other embodiments, however, the virtual remote 282 control can be configured to only incorporate a reduced number of commands and functions. Regardless of the specific implementation of the virtual remote control 282, the user is capable of interacting using the conventional touchscreen interface of the tablet 280. Thus, the selections are made in the same manner as with the physical remote control unit. All commands and functions entered using the virtual remote control 282 are displayed on the television screen, or otherwise confirmed, in the same manner as when using the physical remote control unit.

Figure 7B:
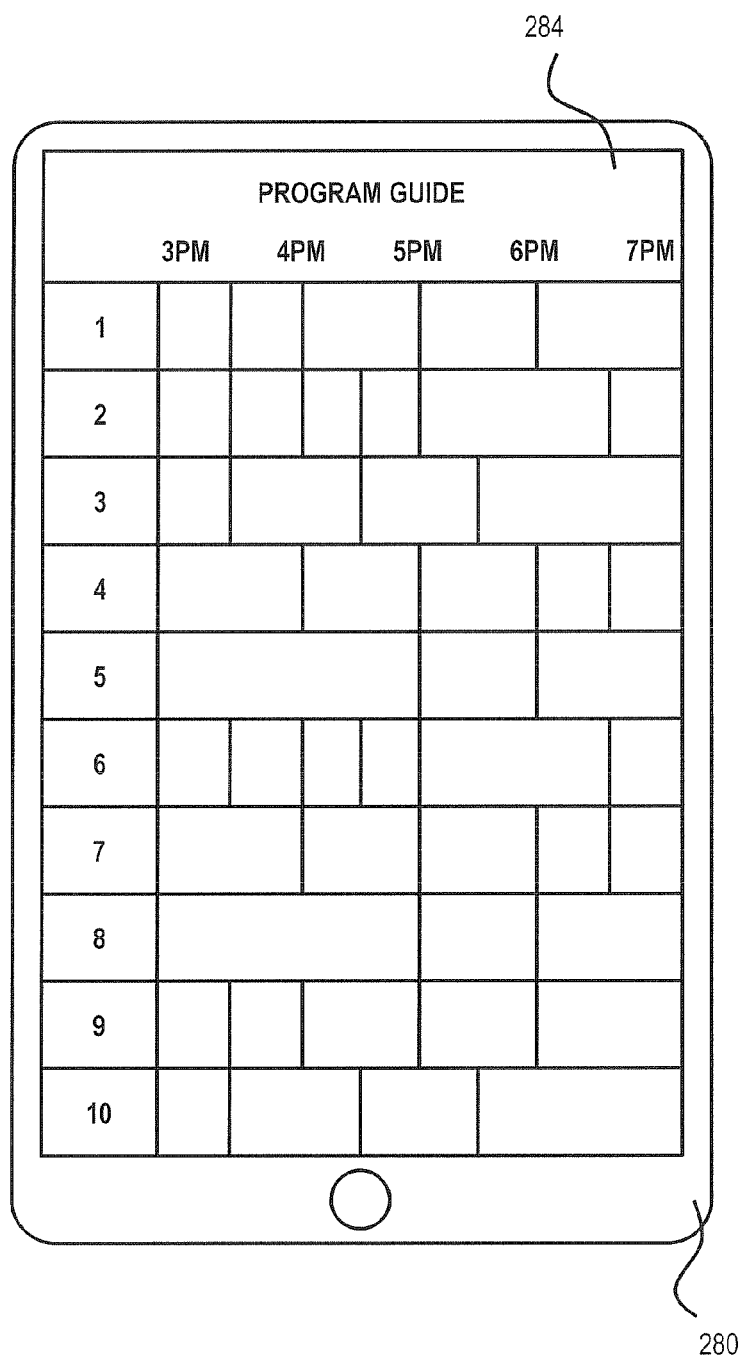
FIG. 7B illustrates a user device for controlling a set-top box, according to another embodiment.

FIG. 7B illustrate the use of a mobile device 280 in accordance with another embodiment. According to the illustrated embodiment, a menu application is provided for the tablet 280 (e.g., mobile device) in order to directly control various features of the set-top box 100. The menu application provides an interface which allows the user to interact with the set-top box 100, while observing certain results of the commands directly on the display screen of the tablet 280. For example, the interface can provide the user with an option to select the program guide. When the user selects the option for the program guide, the program guide is displayed on both the tablet and the television. The user can provide conventional touch commands used to manipulate the tablet in order to scroll through and select items on the program guide. Once an item is selected, the tablet displays the top level command menu of the application, and the selected program is displayed on the television for viewing. Similarly, the menu application may provide the user options to quickly access saved programs, configurations, etc.

Figure 7C:
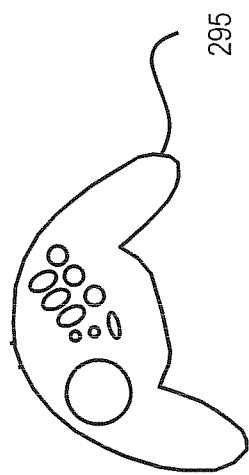
FIG. 7C illustrates a user device for controlling a set-top box, according to another embodiment.

FIG. 7C illustrates command input using a user device in accordance with another embodiment. As shown in the figure, the selected user device is a game console 290 that is interfaced to the gesture layer 220 of the set-top box 100. According to one or more embodiments, the interface may be achieved through wired or wireless connections. The game console 290 includes at least one control unit 295 which allows the user to interact with the set-top box 100. For example, the control unit 295 can include a navigation pad which allows for one or more directional input selections as well as various buttons. Thus, the user can use the navigation pad to navigate through various menus and options, while using one or more buttons to select desired options. According to at least one embodiment, specific buttons on the control unit 295 can be mapped to launch common, or frequently used, functions of the set-top box 100. For example, the control unit 295 illustrated in FIG. 7C includes multiple selection buttons. A first button can be used to select specific items while navigating through menus of the set-top box 100. Other buttons can be assigned specific functions such as launching the program guide, launching a video on demand menu, launching a recorded program menu, etc. According to at least one embodiment, the interface between the set-top box 100 and game console 290 can be configured to allow the user to select desired functions to be mapped to different buttons on the control unit 295. In this way, the user is capable of accessing all of the functions for the set-top box 100 using the control unit.

Figure 8:
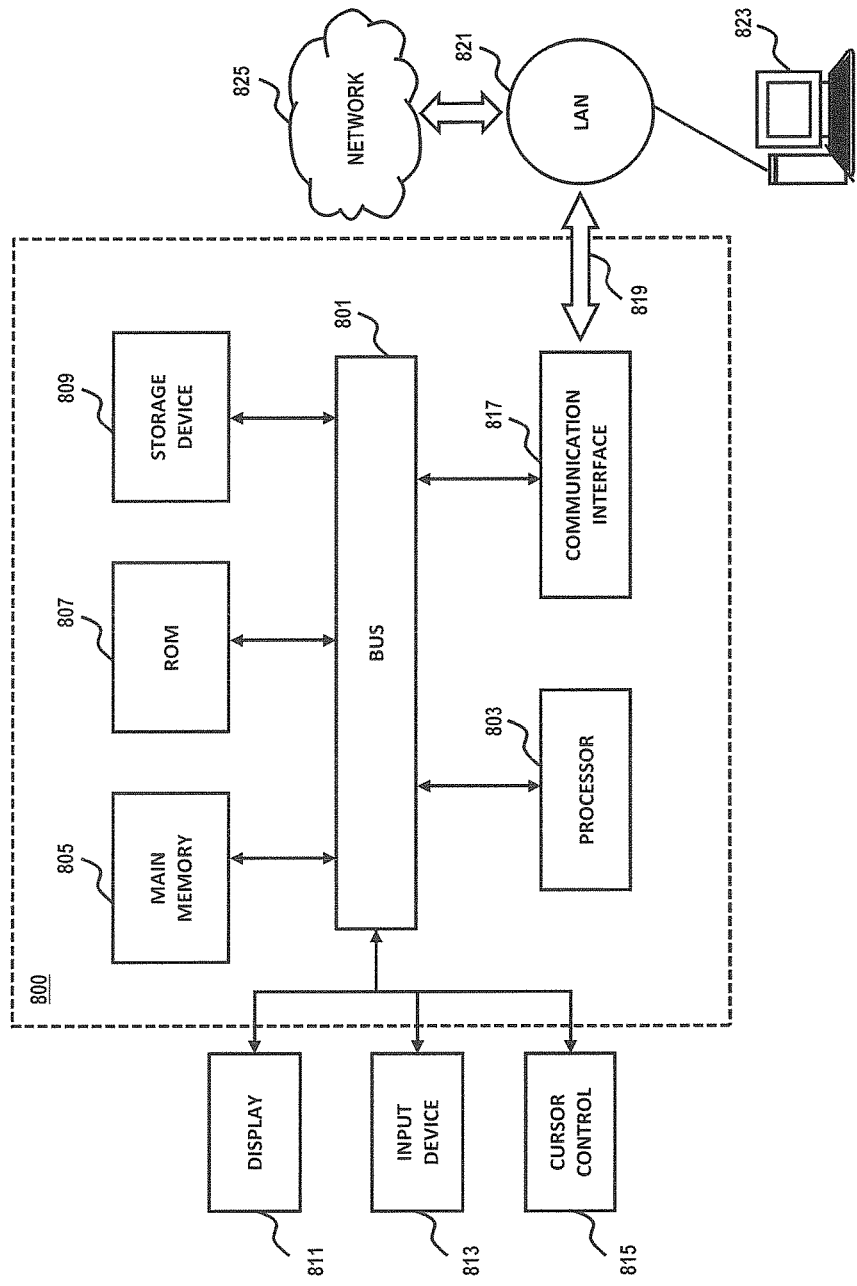
FIG. 8 is a diagram of a computer system that can be used to implement various exemplary embodiments.

FIG. 8 is a diagram of a computer system that can be used to implement various exemplary embodiments. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to certain embodiments, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the disclosed embodiment. Thus, various embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
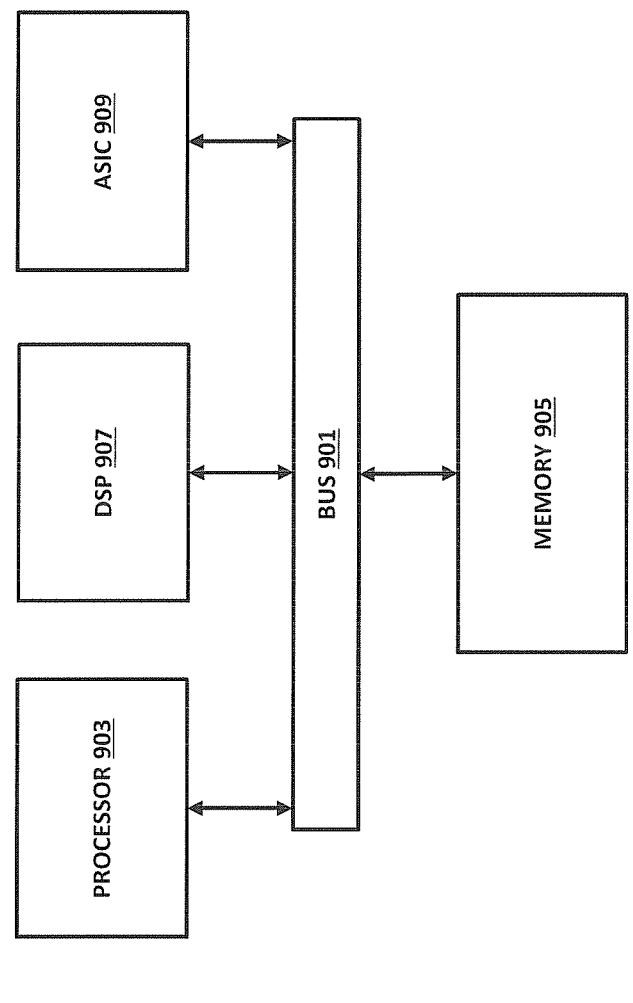
FIG. 9 is a diagram of a chip set that can be used to implement various exemplary embodiments.

FIG. 9 is a diagram of a chip set that can be used to implement various exemplary embodiments. Chip set 900 is programmed to provide an improved EPG as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps discussed with respect to FIGS. 5-6.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide various features, as previously described. The memory 905 also stores the data associated with or generated by the execution of the inventive steps.

While certain exemplary embodiments and implementations have been described herein, other embodiments and modifications will be apparent from this description. Furthermore, although a set-top box is used in describing the various processes and embodiments, any other type of device with capabilities similar to the described set-top box may be used. Accordingly, the various embodiments described are not intended to be limiting, but rather are encompassed by the broader scope of the presented claims and various obvious modifications and equivalent arrangements.

What is claimed is:

1. A method comprising:
    continuously receiving, at a connection layer of an input translation platform, a stream of sensor data from an input device, wherein the stream of sensor data includes a user input for controlling a set-top box;
    parsing, by a gesture layer of the input translation platform, the stream of sensor data to identify the user input;
    generating, by the gesture layer and using a natural user interface (NUI) library, one or more user interface events supported by the set-top box based on the user input, wherein each user interface event corresponds to a particular command to be input to the set-top box based on a current state of the set-top box, and wherein the current state of the set-top box is based on content currently being displayed on a display connected to the set-top box, wherein the NUI library stores a plurality of motion data and sound data to allow a plurality of types of input devices to interact with the set-top box;
    identifying, by the gesture layer, a user interface region associated with the set-top box, wherein the user interface region is associated with the current state of the set-top box, and wherein the user interface region is identified based on a previous registration of the user interface region;
    mapping, by the gesture layer, a user interface event of the one or more user interface events to the user interface region of the set-top box based on the current state of the set-top box; and
    communicating, by the connection layer, the user interface event to the set-top box, wherein the set-top box outputs results of the user interface event to the display.

2. A method of claim 1, wherein the input device is non-native with respect to the set-top box.

3. A method of claim 1, wherein identifying the user interface region comprises:
    identifying the user interface region based on the user input or the sensor data.

4. A method of claim 1, wherein the previous registration includes a configuration parameter associated with the user interface region.

5. A method of claim 4, wherein the configuration parameter includes a gravity parameter, the method further comprising:
    selecting which of the user interface region and one or more other user interface regions to map the user interface event against based on the gravity parameter.

6. A method of claim 1, wherein the NUI library stores a plurality of user interfaces supported by the set-top box.

7. A method of claim 1, further comprising:
    providing connectivity between the input device and the set-top box using a physical connection, a network connection, or a software connection.

8. A method of claim 1, wherein the user input includes a gesture-based input or a voice-based input.

9. An apparatus comprising:
    a plurality of processors configured to:
        continuously receive, at a connection layer, a stream of sensor data from an input device, wherein the stream of sensor data includes a user input for controlling a set-top box;
        parse, by a gesture layer, the stream of sensor data to identify the user input;
        generate, by the gesture layer and using a natural user input (NUI) library, one or more user interface events supported by the set-top box based on the user input, wherein each user interface event corresponds to a particular command to be input to the set-top box based on a current state of the set-top box, and wherein the current state of the set-top box is based on content currently being displayed on a display connected to the set-top box, wherein the NUI library stores a plurality of motion data and sound data to allow a plurality of types of input devices to interact with the set-top box;
        identify, by the gesture layer, a user interface region associated with the set-top box, wherein the user interface region is associated with the current state of the set-top box, and wherein the user interface region is identified based on a previous registration of the user interface region;
        map, by the gesture layer, a user interface event of the one or more user interface events to the user interface region of the set-top box based on the current state of the set-top box; and
        communicate, by the connection layer, the user interface event to the set-top box, wherein the set-top box outputs results of the user interface event to the display.

10. An apparatus of claim 9, wherein the input device is non-native with respect to the set-top box.

11. An apparatus of claim 9, wherein, when identifying the user interface region, the plurality of processors are further configured to:
    identify the user interface region based on the user input or the sensor data.

12. An apparatus of claim 9, wherein the previous registration includes a configuration parameter associated with the user interface region.

13. An apparatus of claim 12, wherein the configuration parameter includes a gravity parameter, and wherein the plurality of processors are further configured to:
    select which of the user interface region or one or more other user interface regions to map the user interface event against based on the gravity parameter.

14. An apparatus of claim 9, wherein the plurality of processors are further configured to:
    generate the one or more user interface events from a common library of a plurality of user interfaces supported by the set-top box.

15. An apparatus of claim 9, wherein the plurality of processors are further configured to:
    provide connectivity between the input device and the set-top box using a physical connection, a network connection, or a software connection.

16. An apparatus of claim 9, wherein the user input includes a gesture-based input or a voice-based input.

17. A system comprising:
    a set-top box; and
    an input translation platform including:

a connection layer, a natural user interface (NUI) library that stores a plurality of motion data and sound data to allow a plurality of types of input devices to interact with the set-top box, and a gesture layer, the input translation platform configured to:

receive, at the connection layer and from an input device, a stream of data, wherein the stream of data represents a user input for controlling the set-top box, parse, by the gesture layer, the stream of data to identify the user input, generate, by the gesture layer and using the NUI library, one or more user interface events supported by the set-top box based on the user input, wherein each user interface event corresponds to a particular command to be input to the set-top box based on a current state of the set-top box, and wherein the current state of the set-top box is based on content currently being displayed on a display connected to the set-top box, identify, by the gesture layer, a user interface region corresponding to a current state of the set-top box, wherein the user interface region is identified based on a previous registration of the user interface region, map, by the gesture layer, a user interface event of the one or more user interface events to the user interface region based on the current state of the set-top box, and communicate, by the gesture layer, the user interface event to the set-top box, wherein the set-top box outputs results of the user interface event to the display.

18. A system of claim 17, wherein the input device is non-native with respect to the set-top box.

19. A system of claim 17, wherein, when identifying the user interface region, the input translation platform is further configured to:

identify the user interface region based on the user input or sensor data.

20. A system of claim 17, wherein the previous registration includes a configuration parameter associated with the user interface region, and wherein the configuration parameter includes a gravity parameter.

21. A system of claim 17, wherein the NUI library stores a plurality of user interfaces supported by the set-top box.

* * * * *